United States Patent [19]

Winiarczyk

[11] 3,795,491
[45] Mar. 5, 1974

[54] METHOD FOR PREPARING AQUEOUS SOLUTIONS OF SODIUM BOROHYDRIDE OF HIGH CONCENTRATION

[75] Inventor: Edward R. Winiarczyk, Salem, Mass.

[73] Assignee: Ventron Corporation, Beverly, Mass.

[22] Filed: Jan. 26, 1972

[21] Appl. No.: 180,005

[52] U.S. Cl.............. 23/299, 23/302, 23/312 R, 423/286
[51] Int. Cl....... B01d 9/02, B01d 11/04, C01b 6/14
[58] Field of Search.......... 23/299, 300, 302, 312 R; 423/286

[56] References Cited
UNITED STATES PATENTS

| | | | |
|---|---|---|---|
| 2,926,991 | 3/1960 | Bragdon | 23/312 R |
| 2,968,523 | 1/1961 | Cunningham | 23/312 R |
| 2,983,574 | 5/1961 | Nigon | 423/286 |
| 3,105,746 | 10/1963 | Schechter | 23/312 R |
| 2,970,114 | 1/1961 | Bragdon | 252/188 |

Primary Examiner—Norman Yudkoff
Assistant Examiner—Curtis P. Ribando

[57] ABSTRACT

Sodium borohydride is extracted from an aqueous solution containing from about 5 to about 12.9 percent sodium borohydride and from about 35 to about 47 percent sodium hydroxide by weight by countercurrent extraction with a solvent for sodium borohydride, such as isopropylamine. The solvent is removed from the extract by distillation leaving an aqueous solution of high sodium borohydride content. From the latter, crystals of sodium borohydride dihydrate are separated leaving an aqueous mother liquor containing about 32 percent sodium borohydride and about 5 percent sodium hydroxide. The mother liquor is diluted with sodium hydroxide or an aqueous solution of high sodium hydroxide content and relatively low sodium borohydride content to obtain an aqueous solution of from about 13 to 30 percent sodium borohydride. The sodium borohydride dihydrate is dried to obtain solid sodium borohydride.

3 Claims, 1 Drawing Figure

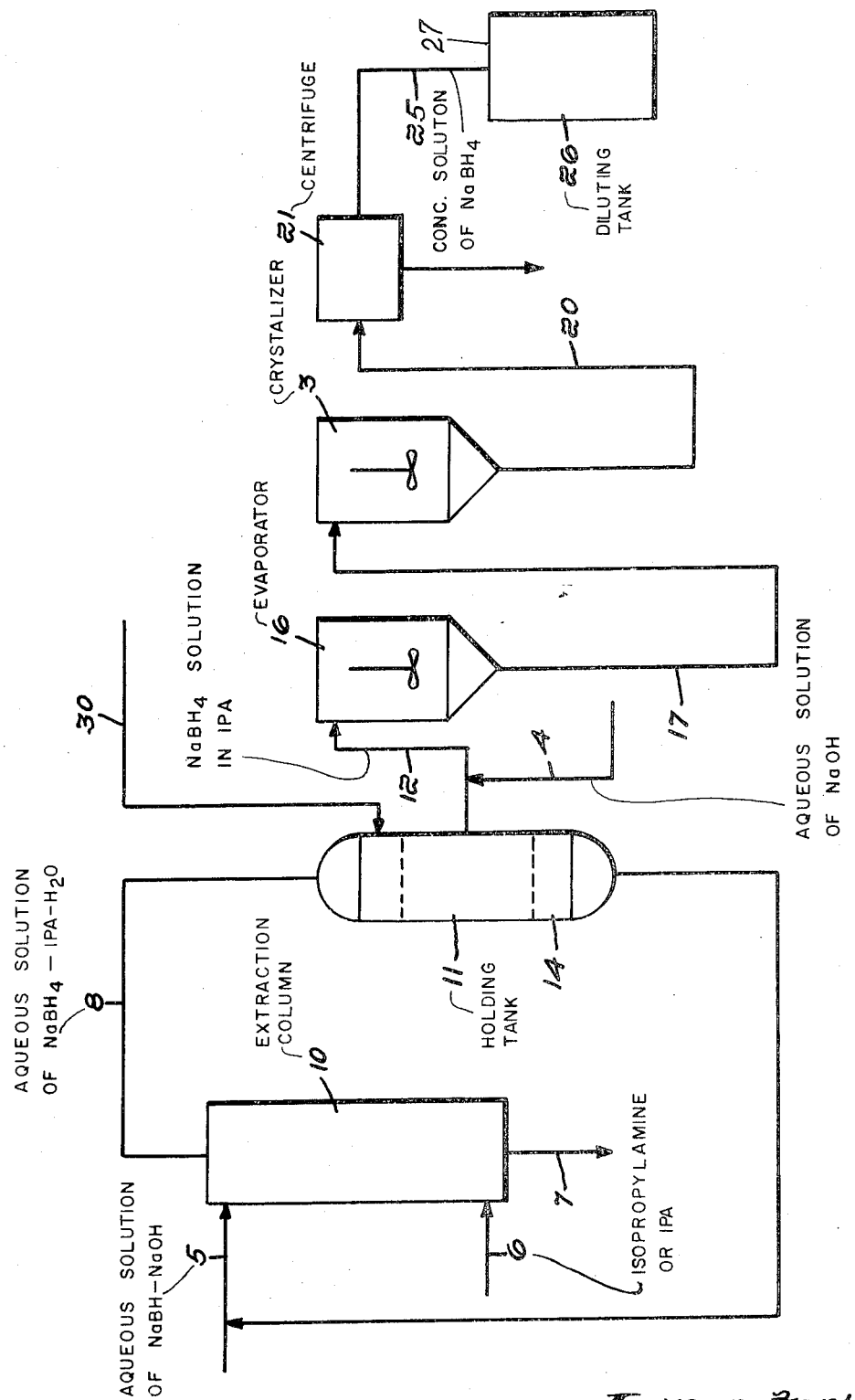

METHOD FOR PREPARING AQUEOUS SOLUTIONS OF SODIUM BOROHYDRIDE OF HIGH CONCENTRATION

This invention relates to the preparation of solid sodium borohydride and an aqueous solution of sodium borohydride of high concentration, that is, between about 13 percent and about 30 percent by weight of sodium borohydride.

Solid sodium borohydride has been prepared by first extracting sodium borohydride from an aqueous solution containing about 12 percent sodium borohydride and about 43 percent sodium hydroxide by weight with a solvent for sodium borohydride and a non-solvent for sodium hydroxide, such as isopropylamine, the two solutions being passed countercurrent in an extraction column. An aqueous solution of sodium hydroxide containing some impurities, such as sodium borate, is discharged from the bottom of the column and an isopropylamine solution of sodium borohydride containing some sodium hydroxide, water, and sodium borate is flowed from the top of the column to a hold or settling tank. In the hold tank the solution separates in two layers, namely, a bottom layer which is essentially an aqueous solution containing sodium borohydride, sodium hydroxide and sodium borate, and a top layer which is an isopropylamine solution of sodium borohydride containing sodium hydroxide and some water.

The bottom layer from the hold tank is recycled to the extraction column. The top layer from the hold tank is flowed to an evaporator where isopropylamine is removed by distillation. The solution or slurry from the bottom of the evaporator contains about 40 percent sodium borohydride, 5 percent sodium hydroxide, some sodium borate and water and is flowed to a crystallizer where the sodium borohydride crystallizes as sodium borohydride dihydrate. The slurry of dihydrate crystals is fed to a centrifuge from which crystals of sodium borohydride dihydrate are passed to a dryer to remove the combined water. The mother liquor from the centrifuge contains about 32 percent sodium borohydride, about 6 percent sodium hydroxide, some sodium borate and the remainder water. This mother liquor is recycled to the hold or settling tank. There is considerable decomposition of the sodium borohydride in the hold tank and evaporator.

I have discovered that if the mother liquor from the centrifuge is not recycled to the hold tank (1) the rate of feed of the original sodium borohydride to the extraction column can be greatly increased, and (2) the amount of decomposition of sodium borohydride in the hold tank and evaporator is greatly reduced thereby reducing the amount of sodium borate in the mother liquor from the centrifuge and rendering it suitable as an aqueous reducing solution of sodium borohydride of high concentration. By diluting this mother liquor with an aqueous solution containing sodium hydroxide, a stable aqueous solution containing an amount of sodium borohydride between about 13 percent and about 30 percent by weight can be produced. As the diluting agent for the mother liquor solid sodium hydroxide may be dissolved therein or an aqueous solution of sodium hydroxide, or an aqueous solution such as that described in the patent to Robert W. Bragdon U.S. Pat. No. 2,970,114, dated Jan. 31, 1961, containing from about 9.35 to 12.9 percent by weight of sodium borohydride and from about 35 to 46.9 percent by weight of sodium hydroxide based upon the weight of the solution.

The single FIGURE in the accompanying drawing illustrates diagramatically the apparatus used in the practice of the method of the invention. Referring to the drawing, an aqueous solution (5) containing from about 5 to about 12.9 percent sodium borohydride and from about 35 to about 47 percent sodium hydroxide by weight is fed continuously into an extraction column 10 near the top thereof and is caused to flow downward continuously therein while a solvent (6) for sodium borohydride which is substantially immiscible with an aqueous sodium hydroxide, such as isopropylamine, is caused to flow upward continuously in the column. An aqueous solution (7) of sodium hydroxide containing some sodium borate is withdrawn continuously from the bottom of the column and stored for other uses. At the same time an isopropylamine solution (8) containing about 6 percent of sodium borohydride and some water is continuously withdrawn from the top of the column and fed to a holding or settling tank (11) where the liquid separates in two layers, namely, a top layer (12) of an isopropylamine solution of sodium borohydride and some sodium hydroxide and a bottom layer (14) of an aqueous solution of sodium borohydride, and sodium hydroxide. The bottom layer is withdrawn continuously and fed into the extraction column 10 with the aqueous solution (5). The top layer (12), which is essentially a solution of sodium borohydride in isopropylamine, is withdrawn continuously and fed to an evaporator 16 for removal of solvent by distillation, an aqueous solution of sodium hydroxide (4), similar to stream 5 or 7, being mixed with the top layer (12) as it is being fed to evaporator (16) to stabilize it. A solution or slurry (17) is continuously withdrawn from the bottom of the evaporator and fed to a crystallizer (3). A slurry (20) of sodium borohydride is withdrawn from the bottom of the crystallizer and fed to a centrifuge 21. Crystals of sodium borohydride dihydrate, $NaBH_4 \cdot 2H_2O$, are withdrawn from the bottom of the centrifuge and fed to a dryer (not shown) to remove the water of hydration to form a substantially pure solid sodium borohydride.

The mother liquor in the centrifuge is an aqueous solution containing about 32 percent sodium borohydride, about 6 percent sodium hydroxide and about 1 percent sodium borate. This mother liquor (25) is withdrawn from the centrifuge and fed to a tank (26) where it is diluted with an aqueous solution (27) of sodium hydroxide or an aqueous solution, such as stream 5, containing from about 5 to 12 percent by weight of sodium borohydride and from about 35 to about 47 percent of sodium hydroxide depending upon the desired concentration of sodium borohydride. In this manner aqueous solutions containing between about 13 to 30 percent by weight of sodium borohydride may be produced. These concentrated sodium borohydride solutions are useful for reducing or hydrogenating many organic compounds, such as aldehydes, ketones, acid halides, etc.

A typical solution produced in accordance with the invention is made as follows:

65 parts by weight of mother liquor containing about 32 percent by weight of sodium borohydride, about 6 percent by weight of sodium hydroxide, and about 1 percent sodium borate and the remainder water was diluted with 35 parts by weight of an aqueous solution containing about 12 percent by weight of sodium borohydride, 43 percent by weight of sodium hydroxide, less than 2 percent by weight of sodium borate and the remainder water to form an aqueous solution containing about 25 percent by weight of sodium borohydride, about 20 percent by weight of sodium hydroxide, about 1 percent of sodium borate and the remainder water. The resulting solution was stable for more than 3 months at ambient temperature and was stable for at least 2 months at 120° F.

In the crystal production of sodium borohydride the present invention has the following advantages:

1. Decomposition loss across the evaporator is reduced by about 67 percent.
2. A higher rate of feed of aqueous sodium borohydride-sodium hydroxide to the extraction column may be substantially increased.
3. Less isopropylamine is required in the extraction column.
4. Less sodium borohydride is in the extraction column and the hold tank thus reducing decomposition of sodium borohydride to sodium borate.
5. The cooling load on the crystallizer is reduced.
6. Less steam is required in the evaporators.

I claim:

1. In a method for continuously preparing an aqueous solution containing from about 13 to about 30 percent by weight of sodium borohydride, the steps which comprise continuously extracting sodium borohydride from an aqueous solution containing from about 5 to 12.9 percent by weight sodium borohydride and from about 35 to about 47 percent sodium hydroxide by weight with a solvent for sodium borohydride which is substantially immiscible with an aqueous sodium hydroxide to obtain a solution of sodium borohydride in said solvent and containing some sodium hydroxide and water, permitting the extract thus obtained to settle forming two layers, the top layer of which is essentially a solution of sodium borohydride in said solvent containing some water and the bottom layer of which is an aqueous solution of sodium borohydride and sodium hydroxide, mixing with said top layer an aqueous solution which is predominantly sodium hydroxide, continuously removing the solvent from the mixture to obtain a concentrated aqueous solution of sodium borohydride and containing about 5 percent sodium hydroxide by weight, continuously removing sodium borohydride from the concentrated solution by crystallization to obtain crystals of sodium borohydride dihydrate and a mother liquor which is a concentrated aqueous solution of sodium borohydride containing about 6 percent sodium hydroxide by weight, and continuously diluting the mother liquor with a material selected from the group consisting of solid sodium hydroxide, an aqueous solution of sodium hydroxide, and an aqueous solution containing from about 5 to about 12.9 percent sodium borohydride and from about 35 to about 47 percent sodium hydroxide by weight to obtain an aqueous solution of sodium borohydride and sodium hydroxide of desired sodium borohydride concentration between about 13 and about 30 percent by weight.

2. The method as claimed by claim 1 wherein the solvent is isopropylamine.

3. The method as claimed by claim 1 wherein said bottom layer is continuously mixed with the liquor being extracted with a solvent for sodium borohydride.

* * * * *